(12) United States Patent
Cheng et al.

(10) Patent No.: US 9,413,902 B2
(45) Date of Patent: Aug. 9, 2016

(54) METHOD AND DEVICE FOR SUPPLYING POWER TO ACCESS DEVICE

(71) Applicant: ZTE Corporation, Shenzhen (CN)

(72) Inventors: Mingming Cheng, Shenzhen (CN); Weiliang Zhang, Shenzhen (CN); Liquan Yuan, Shenzhen (CN); Qun Cheng, Shenzhen (CN); Qiang Guo, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 14/759,429

(22) PCT Filed: Aug. 12, 2013

(86) PCT No.: PCT/CN2013/081330
§ 371 (c)(1),
(2) Date: Jul. 7, 2015

(87) PCT Pub. No.: WO2014/106382
PCT Pub. Date: Jul. 10, 2014

(65) Prior Publication Data
US 2015/0358485 A1     Dec. 10, 2015

(30) Foreign Application Priority Data
Jan. 7, 2013    (CN) .......................... 2013 1 0004908

(51) Int. Cl.
| | |
|---|---|
| *H04M 5/00* | (2006.01) |
| *H04M 19/08* | (2006.01) |
| *H04M 3/22* | (2006.01) |
| *H04M 3/30* | (2006.01) |
| *H04L 12/28* | (2006.01) |
| *H04L 12/10* | (2006.01) |
| *H04L 12/64* | (2006.01) |

(52) U.S. Cl.
CPC .............. *H04M 19/08* (2013.01); *H04L 12/10* (2013.01); *H04L 12/2856* (2013.01); *H04L 12/6418* (2013.01); *H04M 3/2209* (2013.01); *H04M 3/304* (2013.01)

(58) Field of Classification Search
CPC . H04B 10/808; H04M 19/08; H04M 1/72502
USPC ........................................ 379/322, 323, 324
See application file for complete search history.

(56) References Cited

U.S. PATENT DOCUMENTS

| | | | |
|---|---|---|---|
| 2006/0097885 A1 | 5/2006 | Sengupta | |
| 2011/0064212 A1* | 3/2011 | Cooper ................. | H04M 19/08 379/307 |

FOREIGN PATENT DOCUMENTS

| | | | |
|---|---|---|---|
| CN | 1949716 A | | 4/2007 |
| CN | 201639594 U | * | 11/2010 |
| CN | 102025511 A | | 4/2011 |
| CN | 103051462 A | | 4/2013 |
| GB | EP 2362626 A1 | * | 8/2011 ........... H04B 10/808 |

OTHER PUBLICATIONS

International Search for corresponding application PCT/CN2013/081330 filed Aug. 12, 2013; Mail date Oct. 31, 2013.

* cited by examiner

*Primary Examiner* — Quoc D Tran
(74) *Attorney, Agent, or Firm* — Cantor Colburn LLP

(57) ABSTRACT

Provided are a method and device for supplying power to an access device. The method includes: detecting one or more user terminals connected with the access device; and determining one or more user terminals for supplying power to the access device according to a current service state of each of the one or more user terminals connected with the access device. By adopting the technical solution according to the embodiments of the disclosure, the problem in the related art, that as it is impossible to supply power to an access device according to the current service state of each of a plurality of user terminals connected with the access device, the equality of the user terminals in power supply is influenced, is solved, thus guaranteeing the equality of each user terminal connected with the access device in supplying power to the access device.

12 Claims, 4 Drawing Sheets

METHOD AND DEVICE FOR SUPPLYING POWER TO ACCESS DEVICE

TECHNICAL FIELD

The disclosure relates to the communications field, and in particular to a method and device for supplying power to an access device.

BACKGROUND

With rapid development of science and technology, the Digital Subscriber Line (DSL) technology has been capable of providing voice, video and data services on an ordinary twisted pair and, with features including high speed access, low maintenance cost, a capability of making full use of existing networks and safe use, etc, has become one of the most promising and competitive technologies.

The DSL technology has developed to the Second Generation Very-high-bit-rate Digital Subscriber Loop (VDSL2), but the potential of twisted pair has not been fully explored. By expanding frequency spectrum, the latest G.fast technology can provide, on the twisted pair, asymmetrical transmission having an uplink net rate and a downlink net rate both reaching 500 Mbps. This standard has been initiated by the International Telecommunication Union Telecommunication Standardization Sector (ITU-T) in 2011, and its first edition of draft is expected to be issued by the end of 2012.

FIG. 1 is a schematic diagram illustrating reverse powered Fiber To The Distribution Point (FTTDP) in the typical application scenario of G.fast according to the related are. As shown in FIG. 1, a access device for the access of fiber to a Distribution Point (DP) is generally deployed in the basement of a premise or at the position of a wire connection hole. Due to the complexity of access environment, it is relatively difficult to power the access device. If a dedicated wire is laid from a public power source to the access device, then systemic deployment cost will be increased. As the distance between the access device and a user terminal is usually within 200 meters, it is possible to reversely power the access device from the user terminal. However, when a plurality of user terminals connected with the access device reversely power the access device, but if there is not traffic between the plurality of user terminals and a network, the user still should power the access device, which undermines user experience. Apart from this, how to guarantee the equality of the plurality of user terminals and the transparency of the power supply for the access device also become urgent problems.

SUMMARY

The embodiments of the disclosure provides a method and device for supplying power to an access device so as to at least solve the problem in the related art that as it is impossible to power an access device according to the current service state of each of a plurality of user terminals connected with the access device, the equality of the user terminals in power supply is influenced.

A method for supplying power to an access device is provided according to one aspect of the disclosure.

The method for supplying power to an access device includes: detecting one or more user terminals connected with the access device; and determining one or more user terminals for supplying power to the access device according to a current service state of each of the one or more user terminals connected with the access device.

In an example embodiment, determining the one or more user terminals for supplying the power to the access device according to the current service state of each of the one or more user terminals connected with the access device includes: successively judging whether or not the current service state of each of the one or more user terminals connected with the access device is a non-idle state respectively; and supplying the power to the access device using one or more user terminals in the non-idle state.

In an example embodiment, determining the one or more user terminals for supplying the power to the access device according to the current service state of each of the one or more user terminals connected with the access device further includes: using a backup battery to supply power to the access device or all the user terminals connected with the access device to supply power to the access device using, if the one or more terminals connected with the access device are all currently in an idle states.

In an example embodiment, after determining the one or more user terminals for supplying the power to the access device according to the current service state of each of one or more the user terminals connected with the access device, the method further includes: based on that part or all of one or more user terminals for supplying power to the access device break down, making part or all of the broken-down user terminals stop supplying power to the access device.

In an example embodiment, after determining the one or more user terminals for supplying the power to the access device are determined according to the current service state of each of the user terminals connected with the access device, the one or more user terminals for supplying the power to the access device in one of the following ways: making all of the one or more user terminals for supply the power to the access device supplying the power to the access device simultaneously; selecting one user terminal from all the user terminals for supplying the power to the access device to supply the power to the access device according to a preset order; and selecting a plurality of user terminals from all the user terminals for supplying the power to the access device to supply the power to the access device simultaneously.

In an example embodiment, when one user terminal is selected from all the user terminals for supplying the power to the access device to supply the power to the access device according to the preset order, determining a duration during which the selected user terminal supplies the power to the access device according to a service type, corresponding to a current service state of the selected user terminal.

In an example embodiment, after determining the one or more user terminals for supplying the power to the access device according to the current service state of each of the user terminals connected with the access device, the method further includes: measuring power supply corresponding to each of the one or more user terminals for supplying the power to the access device and recording or feeding back a measured result.

An device for supplying the power to an access device is provided according to another aspect of the embodiments of the disclosure.

The device for supplying the power to the access device includes: a detection component configured to detect one or more user terminals connected with the access device; and a determination component configured to determine one or more user terminals for supplying power to the access device according to a current service state of each of the one or more user terminals connected with the access device.

In an example embodiment, the determination component includes: a determination element configured to successively judge whether or not the current service state of each of the one or more user terminals connected with the access device is a non-idle state respectively; and a first determination element configured to supply the power to the access device using the one or more user terminals in the non-idle state.

In an example embodiment, the determination component further includes: a second determination element configured to use a backup battery to supply power to the access device or use all the user terminals connected with the access device to supply power to the access device, if the one or more terminals connected with the access device are all currently in idle states.

In an example embodiment, the device further includes: a first execution component configured to, based on that part or all of the one or more user terminals for supplying the power to the access device break down, make part or all of the broken-down user terminals stop supplying power to the access device.

In an example embodiment, the device further includes: a power supply component configured to supply the power to the access device in one of the following ways: making all of user terminals for supply the power to the access device supplying the power to the access device simultaneously; selecting one user terminal from all the user terminals for supplying the power to the access device to supply the power to the access device according to a preset order; selecting a plurality of user terminals from all the user terminals for supplying the power to the access device to supply the power to the access device simultaneously.

In an example embodiment, the power supply component configured to determine a duration during which the selected user terminal supplies the power to the access device according to a service type corresponding to a current service state of the selected user terminal, when one user terminal is selected from all the user terminals for supplying the power to the access device to supply the power to the access device according to the preset order.

In an example embodiment, the device further includes: a measurement component configured to measure the corresponding power supply corresponding to each of the one or more user terminals for supplying the power to the access device; and a processing component configured to record or feed back the corresponding power supply volume to the each of the one or more user terminals.

By detecting one or more user terminals connected with the access device; and determining one or more user terminals for supplying the power to the access device according to the current service state of each of the user terminals connected with the access device, the technical problem in the related art, that as it is impossible to power an access device according to the current service state of each of a plurality of user terminals connected with the access device, the equality of the user terminals in power supply is influenced, is solved, thereby guaranteeing the equality of the plurality of user terminals connected with the access device in the power supply for the access device.

BRIEF DESCRIPTION OF THE DRAWINGS

The drawings illustrated here provided a further understanding of the disclosure and form a part of the present application, The exemplary embodiments and the description thereof are used to explain the disclosure without unduly limiting the scope of the disclosure, wherein.

DETAILED DESCRIPTION OF EMBODIMENTS

The disclosure will be described hereinafter in detail with reference to the drawings and in conjunction with the embodiments. It needs to be noted that the embodiments of the present application and the features in the embodiments can be combined with each other if no conflict exists.

Figure 1:
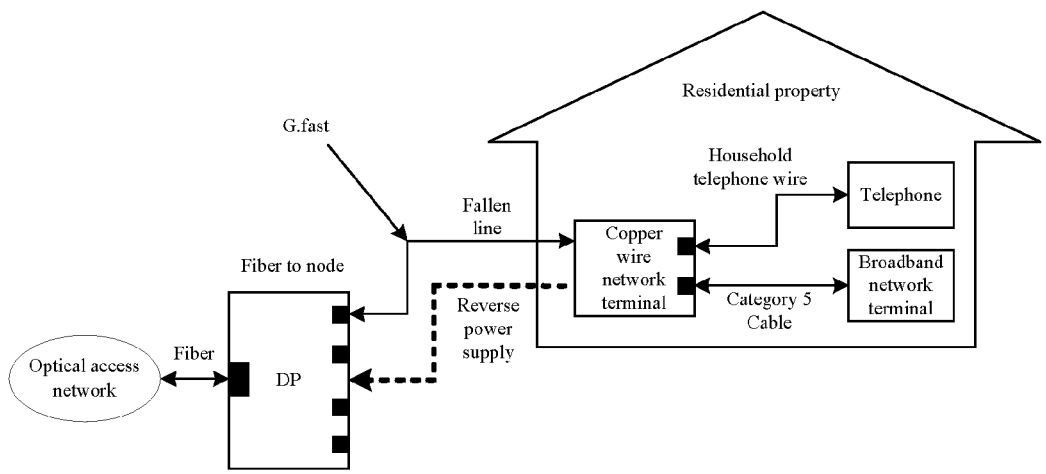
FIG. 1 is a schematic diagram illustrating reverse powered FTTDP in the typical application scenario of G.fast according to the related art.
Figure 2:
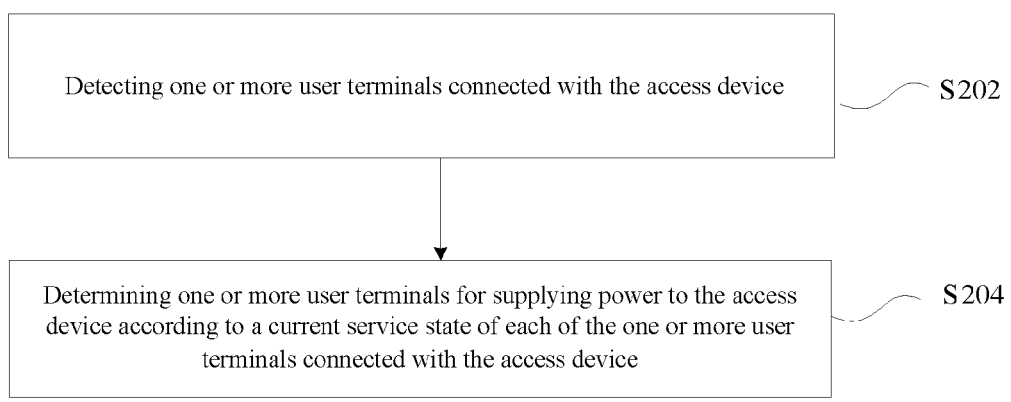
FIG. 2 is a flowchart of a method for supplying power to an access device according to an embodiment of the disclosure.

FIG. 2 is a flowchart of a method for supplying power to an access device according to an embodiment of the disclosure. As shown in FIG. 2, the method may include the following steps:

Step S202: one or more user terminals connected with an access device are detected.

Step S204: one or more user terminals for supplying the power to the access device are determined according to a current service state of each of the one or more user terminals connected with the access device.

In the related art, it is impossible to reversely power an access device using a plurality of user terminals connected with the access device when the user terminals connected with the access device are connected with a network. By detecting one or more user terminals connected with the access device; and determining one or more user terminals for supplying the power to the access device according to the current service state of each of the user terminals connected with the access device, the method shown in FIG. 2 solves the problem existing in the related art that as it is impossible to power the access device according to the current service state of each of a plurality of user terminals connected with the access device, the equality of the user terminals in power supply is influenced, thereby guaranteeing the equality of the plurality of user terminals connected with the access device in the power supply for the access device.

In an example embodiment, if there is only one user terminal connected with the access device, then the user terminal supplies the power to the access device independently; alternatively, the power supply for the access device may be implemented according to a principle that the power of the access device is supplied by the user terminal using the access device or that the power of the access device is supplied longer by the user terminal using the access device longer. That is, either only the power switch of one port is opened every time, or the power of the access device is simultaneously powered by a plurality of user terminals every time.

In an example embodiment, in Step S204, determining the one or more user terminals for supplying the power to the access device according to the current service state of each of the one or more user terminals connected with the access device may include the following operations:

Step S1: whether or not the current service state of each of the one or more user terminals connected with the access device is in a non-idle state respectively is successively judged.

Step S2: the power of the access device is supplied using one or more user terminals in the non-idle state.

In an example embodiment, in Step S204, determining one or more user terminals for supplying the power to the access device according to the current service state of each of the one or more user terminals connected with the access device may further include the following operations:

Step S3: a backup battery is used to supply the power to the access device or all the user terminals connected with the access device are used to supply power to the access device, if the one or more terminals connected with the access device are all currently in idle states.

In an example embodiment, when there is no service interaction between all the user terminals connected with the access device and the access device, to guarantee the connection between the access device and a office device not to be interrupted and the rapid recovery of a service at the sudden arrival of a service, all the no-service user terminals connected with the access device are added in a power supply devices list to equally supply the power to the access device in a power-saving mode in turns.

In an example embodiment, when all the user terminals connected with the same access device are powered off, if the access device is equipped with a battery, then the power of the access device is supplied by the battery, otherwise, the access device is forcedly shut down.

In an example embodiment, in Step S204, after the one or more user terminals for supplying the power to the access device are determined according to the current service state of each of the user terminals connected with the access device, the method may further include the following processing steps:

based on that part or all of one or more user terminals for supplying power to the access device break down, part or all of the broken-down user terminals are made stop supplying power to the access device In an example embodiment, in Step S204, after the one or more user terminals for supplying the power to the access device are determined according to the current service state of each of the one or more user terminals connected with the access device, the one or more user terminals for supplying the power to the access device in one of the following ways:

Way 1: making all user terminals for supplying the power to the access device supply the power to the access device simultaneously;

Way 2: selecting one user terminal from all the user terminals for supplying the power to the access device to supply the power to the access device according to a preset order;

Way 3: selecting a plurality of user terminals from all the user terminals for supplying the power to the access device to supply the power to the access device simultaneously.

In an example embodiment, if the high power consumption of the access device is beyond the power supply capacity of a single user terminal, then a plurality of user terminals are simultaneously selected from the power supply devices list every time to supply the power to the access device together.

In an example implementation process, when one user terminal is selected from all the user terminals for supplying the power to the access device is successively selected to supply the power to the access device according to a preset order, a duration during which the selected user terminal supplies the power to the access device is determined according to a service type, corresponding to a current service state of the selected user terminal.

In an example embodiment, the user terminal is connected with the access device to output a detection voltage to detect the access device according to a certain protocol and provides a stable and reliable power supply for the access device after signals are matched. The access device creates and maintains a power supply devices list and monitors the service state and the power supply state of each port. The access device updates each user terminal in the power supply devices list in real time according to the service state and the power supply state of each port and determines the duration of the power supply by the power supply devices according to the type of the service state supported by each user terminal.

In an example embodiment, in Step S204, after the one or more user terminals for supplying the power to the access device are determined according to the current service state of each of the one or more user terminals connected with the access device, the method may further include the following step:

Step S4: the corresponding power supply corresponding to each of the one or more user terminals for supplying power to the access device is measured, and a measured result is recorded or fed back.

In an example embodiment, the access device orderly and circularly gains power from each user terminal included in the power supply devices list formed in the above way and measures and records the power supply volume of the each user terminal. The access device may provide a query service for the user terminal to inquire about its own power supply volume according to the demand of the user, that is, the power supply volume of each user terminal is transparent to the user.

In an example embodiment, after the user terminal reversely supplies the power to the access device, the user can inquire about the power supply volume of the user terminal by executing the following steps:

Step 1: when reversely powered by a user terminal, the access device measures the power supply volume of a user port and records the result of the measurement in a memory, wherein the result of the measurement may include but is not limited to the following information: a power supply period and a corresponding power supply volume, for example, XX Month XX Day XX Year, power supply volume: XX W.

Step 2: the user may access the configuration page of the user terminal through Web or in the other ways to select a power supply volume query function, inputs a statistical time period range and clicks a query button.

Step 3: the user terminal sends a query request to the access device, the access device reads the data recorded in the memory, feeds the read data back to the user terminal and displays the read data on a page. Alternatively, the access device directly sends a measured power supply volume data to the user terminal so that the measured power supply volume data is stored in the memory of the user terminal. When the user inquires about the power supply volume data, the user directly reads the data in the memory. Alternatively, the access device directly sends the measured power supply volume data to a office server to store the measured power supply volume data in the memory of the office server, and the operator sends the power supply volume data to the user terminal as part of user bill data.

An example implementation process is described further below in conjunction with example embodiments 1 to 3 of the disclosure.

Example Embodiment 1

Powered by a Single User Terminal

Figure 3:
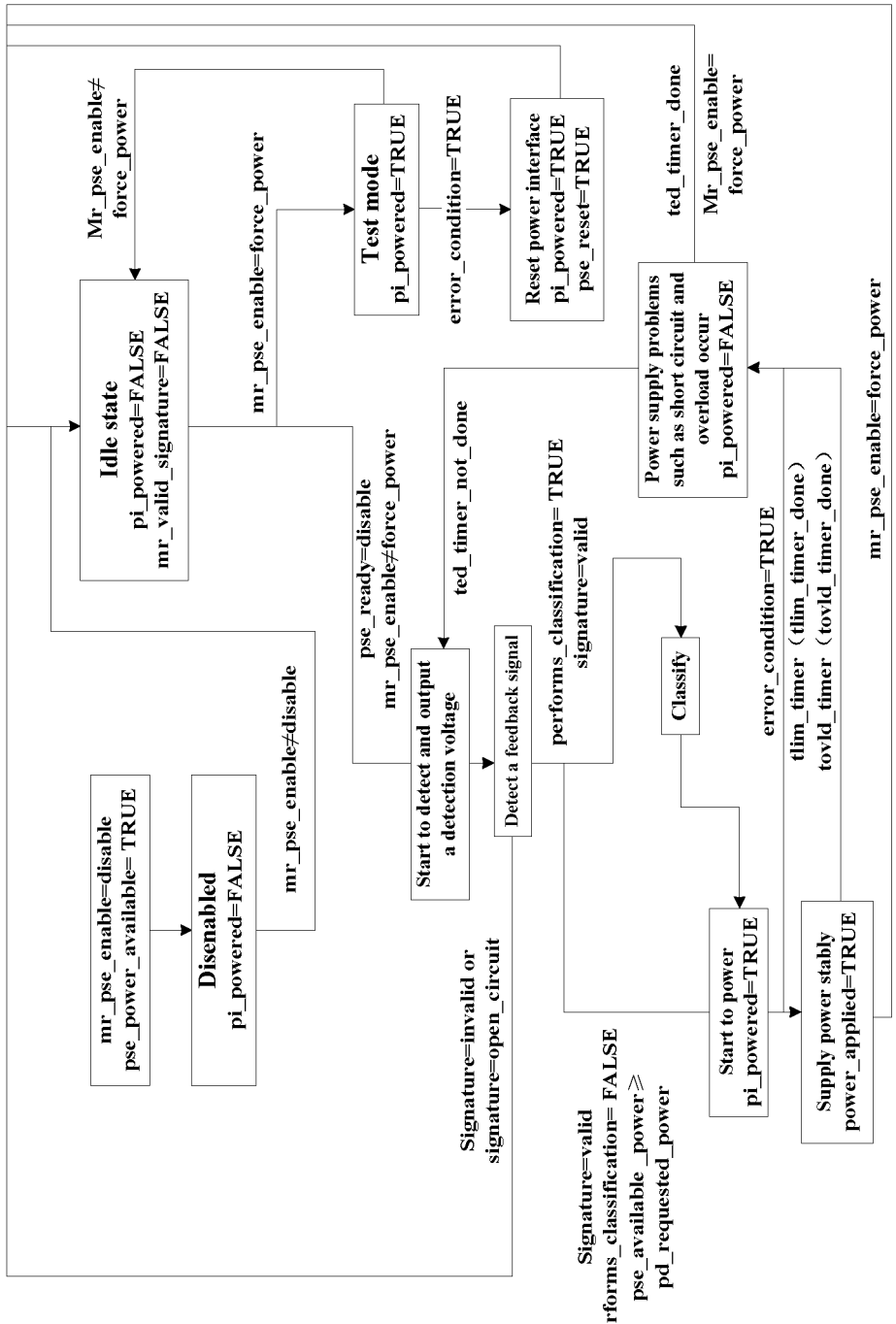
FIG. 3 is a schematic diagram of the state of the power interface of a user terminal according to an example embodiment of the disclosure.

If there is only one user terminal connected with the access device, the user terminal reversely supplies the power to the access device by executing the steps which will be described later. FIG. 3 is a schematic diagram of the state of the power interface of a user terminal according to an example embodiment of the disclosure. As shown in FIG. 3, the method may include the following steps:

Step 1: a user terminal is connected with the access device and powered on (pse_power_available=TRUE), the reverse power supply function of the power interface of the user terminal is enabled (mr_pse_enable≠disable), the power interface enters into an idle state: no matched signal detected (mr_valid_signature=FALSE), and no power supply for a power receiving device (pi_powered=FALSE);

Step 2: after the power interface of the user terminal gets ready, the user terminal starts to detect the power receiving device (pse_ready=TRUE) and outputs a detection voltage $V_{dect}$;

Step 3: after the detection voltage is output, a feedback signal of a link is detected, wherein the feedback signal may include: resistance, capacitance, voltage, current and other electrical characteristics, whether or not the signal is matched (whether or not the signal complies with related protocol standards) is determined and the supply voltage and the power needed by the power receiving device are estimated according to the feedback signal, or the power receiving device is classified according to a required power consumption thereof (performs_classification=TRUE), the access device is the power receiving device of the user terminal;

Step 4: if the user terminal is not connected with the access device (signature=open_circuit) or the access device needs no power supply (signature=invalid), then the power interface of the user terminal returns to an idle state;

Step 5: if the signal is matched (mr_valid_signature=TRUE) and the access device has a need for power supply (signature=valid), and the power consumption needed by the access device is within the power supply capacity range of the user terminal (pd_requested_power<pse_available_power), then the power interface of the user terminal supplies the power to the access device starting from a low voltage (pi_powered=TRUE) until the supply current needed by the access device is reached;

Step 6: the power interface of the user terminal provides a stable and reliable direct current (power_applied=TRUE) for the access device to meet the required power consumption of the access device, and the access device measures and records the power supply volume while monitoring the running state of a power supply link;

Step 7: during the monitoring process, if a short circuit is detected or a current overload lasts for tlim_timer or tovld_timer, or one or more other errors are detected (error_condition=TRUE), then the power interface of the user terminal stops supplying the power to the access device (pi_powered=FALSE), the user terminal detects the power receiving device again, sets a test mode to return to the idle state (mr_pse_enable=force_power) if no power receiving device is detected within a ted_timer time;

Step 8: the user terminal returning to the idle state enters into a test mode to supply the power to the power receiving device (pi_powered=TRUE), and if the error environment still exists (error_condition=TRUE), the power interface of the user terminal is reset (pse_reset=TRUE);

Step 9: during the monitoring process, if it is detected that the supply voltage or current decreases slowly to zero, then it can be known that the user terminal is powered off, if the access device is equipped with a backup battery, then the backup battery is started to supply the power to the access device, otherwise, the access device is shut down as well.

Example Embodiment 2

Powered by a Plurality of User Terminals in Turns

Figure 4:
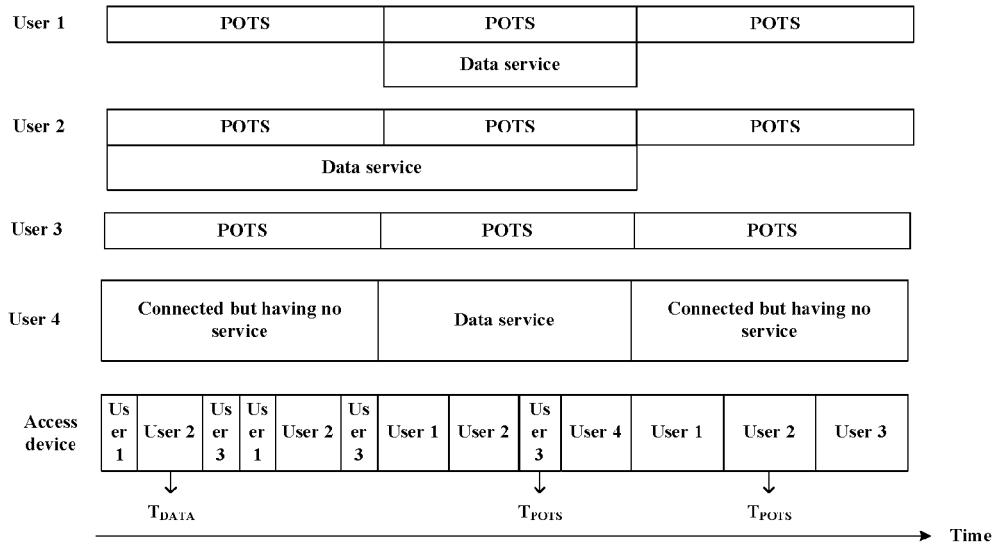
FIG. 4 is a schematic diagram of the power supply for an access device by a plurality of user terminals in turns according to an example embodiment of the disclosure.

FIG. 4 is a schematic diagram of the power supply for an access device by a plurality of user terminals in turns according to an example embodiment of the disclosure. As shown in FIG. 4, when there are a plurality of user terminals connected with the access device, the power of the access device may be supplied through the following steps:

Step 1: a plurality of user terminals are connected with a same access device requiring for power supply;

Step 2: the power interface of each user terminal gets ready, starts to output a detection voltage and detects a feedback signal of a link;

Step 3: if the feedback signal is matched and the power consumption needed by the access device is within the capacity range of the user terminals, then a firstly detected user terminal or the user terminal having a higher supply voltage firstly supplies the power to the access device;

Step 4: the access device is powered and enters into a working state, wherein a working content may include: the establishment and the maintenance of a power supply devices list, the monitoring on the service state of a port and the monitoring on a power supply state;

Step 5: the access device maintains and updates the power supply devices list according to the following rules, the maintenance and update may include: classifying service types of the user terminals, adding or deleting one ore more power supply devices and assigning a power supply time to a power supply device in the list, and the power supply devices list may include but is not limited to the following fields: user terminal ID, service type and power supply time.

Rule 1: the user terminals corresponding to different ports may be classified into three types according to a service state: type 1: user terminals requiring for data services; type 2: user terminals only requiring for Plain Old Telephone Service (POTS); type 3: user terminals connected but requiring for no services; as shown in FIG. 4, each user terminal supplies the power to the access device in turns for three times, during the first round of power supply, a user 1 and a user 3 belong to the second type of terminals, a user 2 belongs to the first type of terminals, and a user 4 belongs to the third type of terminals; during the second round of power supply, the user 3 belongs to the second type of terminals while the user 1, the user 2 and the user 4 belong to the first type of terminals; and during the third round of power supply, the user 1, the user 2 and the user 3 belong to the second type of terminals while the user 4 belongs to the third type of terminal;

Rule 2: when the service type of at least one user terminal belongs to the first or second type, the first type and the second type of user terminals are add into the power supply devices list while the third type of user terminal is not added in the power supply devices list, as shown in FIG. 4, during the first round of power supply, the user 1, the user 2 and the user 3 are added in the power supply devices list; during the second round of power supply, the user 1, the user 2, the user 3 and the user 4 are all added in the power supply devices list; and during the third round of power supply, the user 1, the user 2 and the user 3 are added in the power supply devices list;

Rule 3: the power supply time of each terminal is determined by the type of the service state thereof, the power supply time of the first type of terminals is $T_{data}$, the power supply time of the second type of terminals is $T_{pots}$ ($T_{pots} < T_{data}$), and when all the terminals in the power supply devices list are terminals of the second type, $T_{pots} = T_{data}$;

Rule 4: when all the terminals in the power supply devices list are terminals of the third type, to guarantee the connection of the access device with a office terminal not to be disconnected and the quick recovery of the connection when the user requires for a service, all the user terminals are added in the power supply devices list, and the power supply time of each user terminal is $T_{data}$.

Rule 5: the access device monitors the change in the supply voltage or current of the user terminal and deletes a user terminal from the power supply devices list after determining that the user terminal is powered off, short-circuited or suffers a current overload problem and so on.

Step 6: after the power supply device is updated for the first time, the access device is not powered by a first user terminal for powering the access device any longer, the time at which the power switch of each port is switched on or off is controlled according to the information in the power supply devices list instead, only the power switch of one port is switched on every time, and the power supply volume of each port is measured and recorded;

Step 7: the access device updates the power supply devices list according to the foregoing rules after detecting a change in the service state of the user terminal and controls the power switch of each port according to the updated power supply devices list.

Example Embodiment 3

Simultaneously Powered by Two User Terminals

When there are a plurality of user terminals connected with a same access device, the power of the access device may be supplied according to the following steps:

Step 1: a plurality of user terminals are connected with the same access device needing for power supply;

Step 2: the power interface of the user terminal gets ready, starts to output a detection voltage and detects the feedback signal of a link;

Step 3: if the feedback signal is matched but a rated power consumption (the power consumption needed by all the ports in a running state) needed by the access device is beyond the capacity range of a single user terminal but within the range of the total capacity of two user terminals, then a first detected user terminal or the user terminal having a higher supply voltage firstly supplies power to the access device;

Step 4: the access device is powered and goes into a working state, wherein a working content may include: the establishment and the maintenance of a power supply devices list, the monitoring on the service state of a port and the monitoring on a power supply state;

Step 5: the access device maintains and updates the power supply devices list according to the following rules:

Rule 1: add user terminals requesting for a service in the power supply devices list and set the power supply time of each of the user terminals to be $T_{data}$, ignoring a connected user terminal requesting for nor service;

Rule 2: of all user terminals are connected but request for no service, add all the user terminals in the power supply devices list and set the power supply time of each of the user terminals to be $T_{data}$;

Rule 3: the access device monitors the change in the supply voltage or current of the user terminal and deletes a user terminal from the power supply devices list after determining that the user terminal is powered off, short-circuited or suffers a current overload problem and so on.

Figure 5:
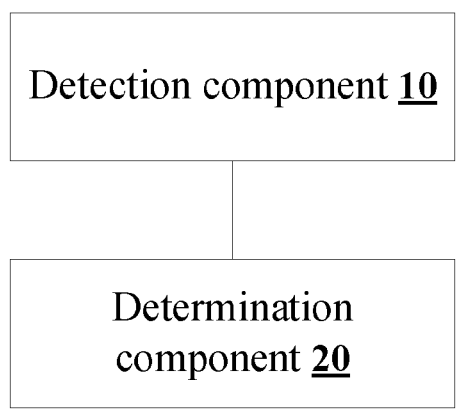
FIG. 5 is a structural diagram of an device for supplying power to an access device according to an embodiment of the disclosure.

Step 6: the access device starts to control the time at which the power switch of each port is switched on or off according to the information in the power supply devices list and measures and records the power supply volume of each port; when few ports of the access device are enabled and the actual power consumption is smaller than $P_{single}$, only the power switch of one port is opened every time; and when the actual power consumption is greater than $P_{single}$, the power switches of corresponding ports of two successive power supply devices in the list are simultaneously switched on every time FIG. 5 is a structural diagram of an device for supplying power to an access device according to an embodiment of the disclosure. As shown in FIG. 5, the power supply device for an access device disclosed herein may include: a detection component 10 configured to detect one or more user terminals connected with the access device; and a determination component 20 configured to determine one or more user terminals for supplying the power to the access device according to a current service state of each of the one or more user terminals connected with the access device.

By using the device shown in FIG. 5, the problem in the related art, that as it is impossible to power an access device according to the current service state of each of a plurality of user terminals connected with the access device, the equality of the user terminals in power supply is influenced, is solved, thus guaranteeing the equality of each user terminal connected with the access device in powering the access device.

In an example embodiment, as shown in FIG. 5, the determination component 20 may include: a determination element 200 configured to successively judge whether or not the current service state of each of the one or more user terminals connected with the access device is a non-idle state respectively; and a first determination element 202 configured to supply the power to the access device using the one or more user terminals in the non-idle state.

Figure 6:
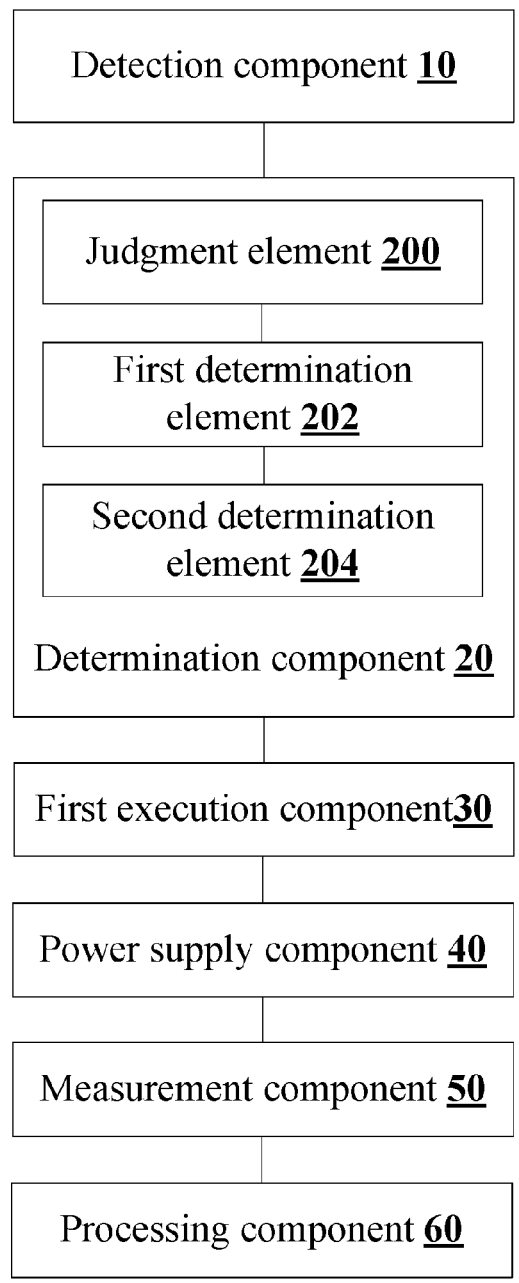
FIG. 6 is a structural diagram of an device for supplying power to an access device according to an example embodiment of the disclosure.

In an example embodiment, as shown in FIG. 6, the determination component 20 may further include: a second determination element 204 configured to use a backup battery to supply power to the access device or use all the user terminals connected with the access device to supply power to the access device, if the one or more terminals connected with the access device are all currently in idle states.

In an example embodiment, as shown in FIG. 6, the device may further include: a first execution component 30 configured to, based on that part or all of the one or more user terminals for supplying the power to the access device break down, make part or all of the broken-down user terminals stop supplying power to the access device.

In an example embodiment, as shown in FIG. 6, the device may further include: a power supply component 40 configured to supply the power to the access device in one of the following ways: making all of the one or more user terminals for supplying the power to the access device supplying the power to the access device simultaneously; selecting one user terminal from all the user terminals for supplying the power to the access device to supply the power to the access device according to a preset order to power the access device; and selecting a plurality of user terminals from all the user terminals for supplying the power to the access device to supply the power to the access device simultaneously.

In an example embodiment, the power supply component 40 is configured to determine a duration during which the selected user terminal supplies the power to the access device according to a service type corresponding to a current service state of the selected user terminal belonging to, when one user terminal is selected from all the user terminals for supplying the power to the access device to supply the power to the access device according to the preset order.

In an example embodiment, as shown in FIG. 6, the device may further include: a measurement component 50 configured to measure the corresponding power supply corresponding to each of the one or more user terminals for supplying the power to the access device; and a processing component 60 configured to record or feed back the corresponding power supply volume to the each of the one or more user terminals.

It can be seen from the description above that the embodiments realize the following technical effects (it should be noted that the effects may be realized by some example embodiments), the problem in the related art, that as it is impossible to power an access device according to the current service state of each of a plurality of user terminals connected with the access device, the equality of the user terminals in power supply is influenced, is solved, thus achieving the power supply for the access device by the user terminals connected with a network, the equality of the user terminals in power supply and the transparency of power supply.

Obviously, those skilled in the art shall understand that the above-mentioned components and steps of the disclosure can be realized by using general purpose calculating device, can be integrated in one calculating device or distributed on a network which consists of a plurality of calculating devices. Alternatively the components and the steps of the disclosure can be realized by using the executable program code of the calculating device. Consequently they can be stored in the storing device and executed by the calculating device, or they are made into integrated circuit component respectively, or a plurality of components or steps thereof are made into one integrated circuit component. In the way, the disclosure is not restricted to any particular hardware and software combination.

Above description is only to illustrate the preferred embodiments but not to limit the disclosure. Various alterations and changes to the disclosure are apparent to those skilled in the art. The protective scope defined in the disclosure shall comprise any modification, equivalent substitution and improvement within the principle of the disclosure.

What is claimed is:

1. A method for supplying power to an access device, comprising:
    detecting one or more user terminals connected with the access device; and
    determining one or more user terminals for supplying power to the access device according to a current service state of each of the one or more user terminals connected with the access device;
    wherein determining the one or more user terminals for supplying the power to the access device according to the current service state of each of the one or more user terminals connected with the access device further comprises:
    if the one or more terminals connected with the access device are all currently in idle states, using a backup battery to supply power to the access device when the access device is equipped with the backup battery or using all the user terminals connected with the access device to supply power to the access device.

2. The method according to claim 1, wherein determining the one or more user terminals for supplying the power to the access device according to the current service state of each of the one or more user terminals connected with the access device comprises:
    judging whether or not the current service state of each of the one or more user terminals connected with the access device is a non-idle state respectively; and
    supplying the power to the access device using one or more user terminals in the non-idle state.

3. The method according to claim 2, wherein after determining the one or more user terminals for supplying the power to the access device according to the current service state of each of the one or more user terminals connected with the access device, the method further comprises:
    based on that part or all of the one or more user terminals for supplying the power to the access device break down, making part or all of the broken-down user terminals stop supplying power to the access device.

4. The method according to claim 1, wherein after determining the one or more user terminals for supplying the power to the access device according to the current service state of each of the user terminals connected with the access device, the one or more user terminals for supplying the power to the access device in one of the following ways:
    making all user terminals for supplying the power to the access device supply the power to the access device simultaneously;
    selecting one user terminal from all the user terminals for supplying the power to the access device to supply the power to the access device according to a preset order;
    selecting a plurality of user terminals from all the user terminals for supplying the power to the access device to supply the power to the access device simultaneously.

5. The method according to claim 4, wherein when one user terminal is selected from all the user terminals for supplying the power to the access device to supply the power to the access device according to the preset order, determining a duration during which the selected user terminal supplies the power to the access device according to a service type corresponding to a current service state of the selected user terminal.

6. The method according to claim 1, wherein after determining the one or more user terminals for supplying the power to the access device according to the current service state of each of the user terminals connected with the access device, the method further comprises:
    measuring power supply corresponding to each of the one or more user terminals for supplying the power to the access device, and recording or feeding back a measured result.

7. A device for supplying power to an access device, comprising:
    a detection component that detect one or more user terminals connected with the access device; and
    a determination component that determine one or more user terminals for supplying power to the access device according to a current service state of each of the one or more user terminals connected with the access device;
    wherein the determination component comprises:
    a second determination element that, if the one or more terminals connected with the access device are all currently in idle states, use a backup battery to supply power to the access device when the access device is equipped with the backup battery or use all the user terminals connected with the access device to supply power to the access device.

8. The device according to claim 7, wherein the determination component comprises:

a judgment element that judge whether or not the current service state of each of the one or more user terminals connected with the access device is a non-idle state respectively; and a first determination element that supply the power to the access device using one or more user terminals in the non-idle state.

9. The device according to claim 8, wherein the device further comprises:

a first execution component that, based on that part or all of the one or more user terminals for supplying the power to the access device break down, make part or all of the broken-down user terminals stop supplying power to the access device.

10. The device according to claim 7, wherein the device further comprises: a power supply component that supply the power to the access device in one of the following ways:

making all user terminals for supplying the power to the access device supply the power to the access device simultaneously;

selecting one user terminal from all the user terminals for supplying the power the access device to supply the power to the access device according to a preset order;

selecting a plurality of user terminals from all the user terminals for supplying the power to the access device to supply the power to the access device simultaneously.

11. The device according to claim 10, wherein the power supply component that determine a duration during which the selected user terminal supplies the power to the access device according to a service type corresponding to a current service state of the selected user terminal, when one user terminal is selected from all the user terminals for supplying the power to the access device to supply the power to the access device according to the preset order.

12. The device according to claim 7, wherein the device further comprises:

a measurement component that measure power supply corresponding to each of the one or more user terminals for supplying the power to the access device; and a processing component that record or feed back the corresponding power supply to the each of the one or more user terminals.

* * * * *